United States Patent
Konieczny et al.

(10) Patent No.: US 8,302,384 B2
(45) Date of Patent: Nov. 6, 2012

(54) MOTOR VEHICLE AND METHOD FOR OPERATING A MOTOR VEHICLE HAVING AN EXHAUST GAS HEATING DEVICE

(75) Inventors: Jörg-Roman Konieczny, Much (DE); Rolf Brück, Bergisch Gladbach (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 275 days.

(21) Appl. No.: 12/627,121

(22) Filed: Nov. 30, 2009

(65) Prior Publication Data
US 2010/0126147 A1   May 27, 2010

Related U.S. Application Data

(63) Continuation of application No. PCT/EP2008/056179, filed on May 20, 2008.

(30) Foreign Application Priority Data

May 31, 2007   (DE) .......................... 10 2007 025 419

(51) Int. Cl.
*F01N 3/00* (2006.01)
(52) U.S. Cl. ................. 60/286; 60/274; 60/277; 60/300; 60/303
(58) Field of Classification Search .................... 60/274, 60/277, 284, 286, 300, 303, 614
See application file for complete search history.

(56) References Cited

U.S. PATENT DOCUMENTS

| 5,323,607 | A | | 6/1994 | Tanaka et al. |
| 5,323,868 | A | * | 6/1994 | Kawashima ............ 180/65.245 |
| 5,411,711 | A | | 5/1995 | Swars |
| 5,501,073 | A | * | 3/1996 | Miyashita et al. .............. 60/284 |
| 5,553,451 | A | * | 9/1996 | Harada ........................... 60/277 |
| 5,588,291 | A | | 12/1996 | Maus et al. |
| 5,785,138 | A | * | 7/1998 | Yoshida ................... 180/65.245 |
| 5,966,931 | A | * | 10/1999 | Yoshizaki et al. .............. 60/284 |
| 6,151,890 | A | * | 11/2000 | Hoshi ............................. 60/297 |
| 6,892,530 | B2 | | 5/2005 | Montreuil et al. |

(Continued)

FOREIGN PATENT DOCUMENTS

| DE | 4241494 A1 | 6/1994 |
| DE | 4042562 C2 | 4/1997 |
| DE | 10127782 A1 | 1/2002 |

(Continued)

OTHER PUBLICATIONS

International Search Report dated Sep. 5, 2008.

*Primary Examiner* — Binh Q Tran
(74) *Attorney, Agent, or Firm* — Laurence A. Greenberg; Werner H. Stemer; Ralph E. Locher

(57) ABSTRACT

A method for operating a motor vehicle which has a drive and an exhaust system with at least one controllable heating device to be placed in contact with exhaust gas, includes at least the following steps:
(a) detecting at least one operating parameter of the exhaust system,
(b) determining at least one influential variable of the heating device,
(c) comparing the at least one influential variable with a target parameter of the exhaust system, and
(d) activating the heating device in such a way that the operating parameter reaches the target parameter. A motor vehicle having a drive and an exhaust system is also provided.

10 Claims, 1 Drawing Sheet

U.S. PATENT DOCUMENTS

Figure 1:
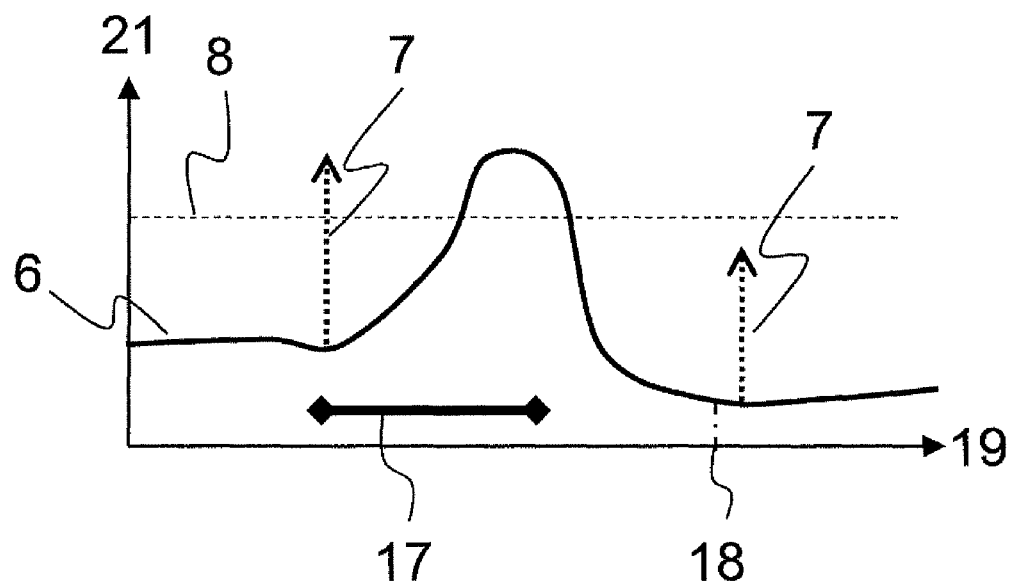

| | | |
|---|---|---|
| 7,093,427 B2 | 8/2006 | van Nieuwstadt et al. |
| 7,174,708 B2 | 2/2007 | Bardon et al. |
| 7,550,119 B2 * | 6/2009 | Kojima ......................... 422/180 |
| 2004/0098974 A1 | 5/2004 | Nieuwstadt et al. |
| 2004/0098980 A1 | 5/2004 | Montreuil et al. |
| 2005/0115228 A1 | 6/2005 | Bardon et al. |

FOREIGN PATENT DOCUMENTS

| | | |
|---|---|---|
| DE | 10225273 B4 | 6/2006 |
| EP | 1898061 | 3/2008 |
| JP | 2001355434 A | 12/2001 |
| JP | 2002256846 A | 9/2002 |
| WO | 9202714 A1 | 2/1992 |

* cited by examiner

MOTOR VEHICLE AND METHOD FOR OPERATING A MOTOR VEHICLE HAVING AN EXHAUST GAS HEATING DEVICE

CROSS-REFERENCE TO RELATED APPLICATION

This is a continuation, under 35 U.S.C. §120, of copending International Application No. PCT/EP2008/056179, filed May 20, 2008, which designated the United States; this application also claims the priority, under 35 U.S.C. §119, of German Patent Application DE 10 2007 025 419.0, filed May 31, 2007; the prior applications are herewith incorporated by reference in their entirety.

BACKGROUND OF THE INVENTION

Field of the Invention

The present invention relates to a method for operating a motor vehicle which has a drive and an exhaust system with at least one controllable heating device that can be placed in contact with exhaust gas. The invention also relates to a motor vehicle having a drive and an exhaust system.

It is considered to be known to place the exhaust gases generated by an engine of a motor vehicle in contact with a heating device in order to influence the temperature of the exhaust gas. Furthermore, it is also considered to be known that such heating devices are used, for example, directly after a cold start or restart of an engine or of an exhaust system, to quickly bring the exhaust gases or the exhaust-gas purification components, which are provided with a catalytically active coating, up to the reaction temperature, in particular up to a temperature at which an interaction of the catalytic converter with the pollutants of the exhaust gas takes place.

Heating devices which have already been proposed are, in particular, those which are heated as a result of ohmic resistance heating. An electrical conductor, which is traversed by current at desired times, is heated up due to its resistance and can thereby heat the catalytically active material which is positioned thereon and/or the exhaust gas. There are various configurations of heating devices of that type. In particular, wire-mesh constructions, honeycomb bodies, plate constructions and the like have already been described.

With regard to the operation of heating devices of that type, it is likewise considered to be known that the heating devices have been activated before or during starting of the engine or if appropriate shortly after starting the engine in order to improve cold-start behavior for a limited time period, in which it has been taken into consideration in particular that sufficient energy could be provided from the vehicle. Furthermore, it is also known to use heating devices of that type in combination with particle filters in order to permit a thermal regeneration of the trapped particles in such a case. For that purpose, it is known to activate the heating devices when a predefined operating time period has elapsed or the particle loading in the filter has reached a predefined value.

The known applications and/or strategies for use have, however, only partially led to the desired results. It was, in particular, found that the use of the heating device resulted in part in an undesirably high energy requirement and the activation cycles in part took up very long time periods.

SUMMARY OF THE INVENTION

It is accordingly an object of the invention to provide a motor vehicle and a method for operating a motor vehicle having an exhaust gas heating device, which overcome the hereinafore-mentioned disadvantages and at least partially solve the highlighted problems of the heretofore-known devices of this general type and which permit the use of such heating devices in exhaust systems of mobile internal combustion engines in an energy-saving and effective manner.

With the foregoing and other objects in view there is provided, in accordance with the invention, a method for operating a motor vehicle. The method comprises:

providing the motor vehicle with a drive and an exhaust system having at least one controllable heating device to be placed in contact with exhaust gas;

(a) detecting at least one operating parameter of the exhaust system;

(b) determining at least one influential variable of the heating device;

(c) comparing the at least one influential variable with a target parameter of the exhaust system; and (d) activating the heating device in such a way that the operating parameter reaches the target parameter.

The method according to the invention therefore relates, in particular, to the regulation of a heating device which is in contact with the exhaust gas of a motor vehicle engine, in such a way that a desired target parameter of the exhaust system or a component therein is reliably reached.

The "drive," in addition to known diesel or gasoline engines, can also relate to other comparable drives which ultimately generate a pollutant-laden exhaust gas or an exhaust gas which must be subjected to temperature treatment. The "exhaust system" is often formed by a tract (or a plurality of tracts), in particular in the form of a tubular line. The exhaust system, which conducts the exhaust gas in a preferred direction, now has at least one heating device provided therein which in particular at least partially spans the inner cross section of the exhaust system. In this case, the heating device forms passages, ducts or the like through which the exhaust gas flows. The heating device can also have further functions in addition to its heating function, for example a catalytic conversion, or accumulation or deflection of exhaust-gas constituents.

According to step (a), at least one operating parameter of the exhaust system is firstly detected at a predefinable time (during the driving mode of the motor vehicle). The measurement of the operating parameter can take place through the use of at least one measuring sensor, various sensors and/or a mathematical model. The temperatures of the exhaust gas at one or more positions of the exhaust system, the temperature of an exhaust-gas treatment component in the interior of the exhaust system, the composition of the exhaust gas, the mass flow of the exhaust gas and the like are considered, in particular, as operating parameters. In this case, a measured or calculated value which is significant for the considered operating parameter is preferably registered or even stored.

In step (b), which can fundamentally also take place before and/or at the same time as step (a), at least one influential variable or value of the heating device is determined. For this purpose, it is preferable firstly to resort to characteristic values of the heating device (for example thermal mass, geometric surface, current supply, electrical resistance and the like). However, the operating parameter measured in step (a) or one of the measured operating parameters is additionally taken into consideration. In this case, use is made in particular of the knowledge that the influential variable of the heating device is dependent on at least one operating parameter of the exhaust system. In other words, this means, for example, that the heating device can bring about a temperature increase only to a certain extent for a given exhaust gas mass flow. The temperature increase potential could be considered as an influential variable.

In step (c), which is preferably carried out after steps (a) and (b), the at least one influential variable of the heating device is compared with a target parameter of the exhaust system. The target parameter is, for example, read out from a provided data storage device and/or has been calculated (if appropriate on an ongoing basis). Such a target parameter of the exhaust system can be a predefined value of one or more operating parameters of the exhaust system. It is fundamentally the case that the method according to the invention can already be interrupted if the measured operating parameter from step (a) is already in a preferred relationship with respect to the target parameter, that is to say additional measures need not be taken. A query of that type can be provided before and/or during or after step (a). If, however, it is determined that the measured operating parameter is not in a preferred relationship with respect to the target parameter, then on the basis of the comparison, it is determined to what extent the influential variable ensures with sufficient probability that the present operating parameter can be brought into the desired relationship with respect to the target parameter of the exhaust system when the heating device is actuated.

In step (d), it is now proposed that an activation of the heating device should take place only when the operating parameter reaches the target parameter. For example, if the measured operating temperature of the exhaust system is so low that even an activation of the heating device will generate such a small temperature increase that the target temperature will not be reached, then the heating device is not activated. At this time, it can also be decided as to whether or not the method according to the invention is repeated directly until an activation of the heating device is expedient. However, it is also possible to firstly implement other measures in order to finally start the use of the heating device in a favorable manner in terms of energy.

It is thereby possible, in particular, for a permanent check of the possibility for use of a heating device to be realized. In this case, an abort criterion is defined for situations in which the activation of the heating device is not expedient, before no other (additional, if appropriate simultaneous or preceding) measures promote the desired effect of the heating device. A particularly economical use of the heating device during operation of the motor vehicle, which is effective in terms of energy, is ensured in this way.

In accordance with another mode of the invention, it is proposed that the method be carried out at least during a predominant time period between the activation and deactivation of the drive. It is very particularly preferable for the method to be started with the activation, carried out continuously and ended with the deactivation of the drive. In other words, this means in particular that the method, if appropriate in fixedly predefined and/or dynamic cycles, carries out a comparison of the at least one operating parameter of the exhaust system with the influential variable of the heating device, and an activation of the heating device takes place if required.

In accordance with a further mode of the invention, it is also considered to be advantageous for step (a) to relate to at least one of the following parameters as operating parameters: exhaust-gas temperature and/or exhaust-gas mass flow. Furthermore, in particular the following parameters of the exhaust gas are also considered: exhaust-gas composition and/or concentration content of a predefined proportion of the exhaust gas, etc.

The operating parameters can be measured on an ongoing basis through the use of (at least) one measuring sensor, a probe or a similar apparatus, although it is also possible to calculate the operating parameter for example from the operating data of the drive and further characteristic variables.

In accordance with an added mode of the invention, with regard to step (b), it is preferable for the heating power of the heating device to be considered as an influential variable. The heating power relates, in particular, to the value which the heating device permits as a temperature increase for the given exhaust-gas mass flow. Consequently, a heating power (H) could, for example, be specified as a difference from the average temperature of the exhaust gas after contact with an active heating device ($T_H$) to the average temperature of the exhaust gas before contact with the heating device ($T_I$): $H=T_H-T_I$. In the case of honeycomb-shaped heating devices, in particular having at least partially structured sheet metal foils and a voltage source of 12-14 Volts, it is preferably possible to specify the following heating powers as (in particular lower) influential variables:

H (Exhaust gas mass flow: 0.017 kg/s): 46-52 Kelvin;
H (Exhaust gas mass flow: 0.023 kg/s): 40-44 Kelvin;
H (Exhaust gas mass flow: 0.027 kg/s): 31-35 Kelvin;
H (Exhaust gas mass flow: 0.030 kg/s): 24-28 Kelvin;
H (Exhaust gas mass flow: 0.035 kg/s): 22-24 Kelvin;
H (Exhaust gas mass flow: 0.040 kg/s): 18-22 Kelvin.

The values stated above relate in particular to a heating device which includes a sheet metal foil configuration which has a multiplicity of passages (300 to 600 cpsi) and which realizes the specified heating power over a 10 to 15 mm heating path (passage length in the flow direction of the exhaust gas). The ranges of fluctuation result, for example, from the sheet metal foil configuration being heated during operation (heat capacity), the averaging of the dynamic temperature profiles and the like.

In accordance with an additional mode of the invention, the target parameter of the exhaust system in step (c) relates to at least one of the following parameters: exhaust-gas temperature, capacity for the reaction of particles contained in the exhaust gas, probability of catalytic reaction and/or capacity for the conversion of a state of aggregation of the exhaust gas or of an additive, etc. With regard to the capacity for the reaction of the particles contained in the exhaust gas, it should be noted that, with the heating device, it is for example possible to create an ambient condition in which a conversion of particles into gaseous constituents takes place. An increase in the probability of catalytic reaction can be obtained by virtue, for example, of ambient conditions being created at the heating device, and/or at exhaust-gas treatment components situated downstream thereof in the flow direction, in which a catalytically activated chemical reaction of exhaust-gas constituents is initiated. Furthermore, the target parameter can also relate to a capacity for the conversion of a state of aggregation of the exhaust gas and of an additive (reducing agent, water, etc.).

In accordance with again another mode of the invention, a method is considered to be advantageous in which step (d) is carried out as a function of the target parameter over a predefined activation time period and the heating device is subsequently deactivated. It is very particularly preferable for the activation time period to be variable depending on the type of target parameter. For example, temperature increases of the exhaust gas can be realized over a shorter activation time period than a conversion of particles. Tests have shown that, for the following parameters and following boundary conditions, at the respectively described heating devices, the activation time periods listed below are advantageous:

At a catalytic converter which is connected downstream of the heating device and which has a catalytic coating for the oxidizing conversion of carbon monoxide, an average temperature of the exhaust gas after contact with an active heating device ($T_{II}$) should be present which ensures an exhaust-gas temperature of 150° C. upon entry into the catalytic converter.

At a catalytic converter which is connected downstream of the heating device and which has a catalytic coating for the oxidizing conversion of hydrocarbons, an average temperature of the exhaust gas after contact with an active heating device ($T_{II}$) should be present which ensures an exhaust-gas temperature of 170° C. upon entry into the catalytic converter.

At a catalytic converter which is connected downstream of the heating device and which has a catalytic coating for the selective catalytic reduction of nitrogen oxides, an average temperature of the exhaust gas after contact with an active heating device ($T_{II}$) should be present which (a) ensures an exhaust-gas temperature of 200° C. upon entry into the catalytic converter with a coating including vanadium, and (b) ensures an exhaust-gas temperature of 250° C. to 600° C. upon entry into the catalytic converter with a coating including iron zeolite (Fe-CSM system) (if appropriate varying as a function of the $NO_x$ composition of the exhaust gas flow).

The deactivation of the heating element can be carried out in particular when an activation of the downstream catalytic converter or particle filter (for example with temperature difference monitoring across the catalytic converter or particle filter) has been detected. The method proposed herein can then begin again with the monitoring.

In accordance with again a further mode of the invention, in order to ensure a particularly high level of effectiveness of the method, it is also proposed that step (d) be carried out through the use of at least one electrically heatable honeycomb body. With a honeycomb body of that type, it is possible to realize relatively small channels through which the exhaust gas is conducted. At the same time, the honeycomb body consequently provides a large contact area with the exhaust gas, so that intensive contact between the heat source and the exhaust gas can be realized in this case. It is consequently possible, with a compact configuration of the honeycomb body, and through the use of short activation cycles, for the desired target parameter to be effectively used in a multiplicity of measured operating states. With regard to the construction of an electrically heatable honeycomb body of that type, reference is made to the patent publications of the corporate assignee of the instant application, in particular to the content of International Publication No. WO 96/10127, corresponding to U.S. Pat. No. 5,768,889, which can be taken into consideration in this case at all times for an explanation of the construction and the function of an electrically heatable honeycomb body of that type.

In accordance with again an added mode of the invention, it is also proposed that an external activation request of the heating device be denied if step (b) yields that the at least one influential variable of the heating device is not sufficient to meet the condition from step (d). This means, in particular, that the activation of the heating device could for example be demanded by other components of the motor vehicle. For example, probes could establish that the pressure drop across a particle trap is too great and that a regeneration would therefore be necessary. Likewise, the monitoring of the load operating point of the drive could also signal that the temperature of the exhaust gas is now too low. The engine management system could now want to activate the heating device. It was, however, found that, in precisely such situations, it is merely the case that additional energy for the heating device is required and consumed without ultimately definitely achieving the desired aim. It is therefore additionally proposed that the external activation take place only if the condition from step (d) can be met.

In accordance with again an additional mode of the invention, it should be noted that preferably at least one of the following variables is calculated: operating parameter of the exhaust system, influential variable of the heating device and/or target parameter of the exhaust system. The calculation of the variable(s) can take place on the basis of one or more of the other variables specified herein. It is preferable for at least one of the variables to (also) be measured through the use of measuring technology, in particular using at least one measuring sensor.

With the objects of the invention in view, there is concomitantly provided a motor vehicle, comprising a drive emitting exhaust gas, an exhaust system having at least one controllable heating device to be placed in contact with the exhaust gas, and a control unit connected at least to the heating device for carrying out the method described herein according to the invention.

Other features which are considered as characteristic for the invention are set forth in the appended claims, noting that the features listed individually in the claims can be combined with one another in any desired technologically expedient manner and highlight further embodiments of the invention.

Although the invention is illustrated and described herein as embodied in a motor vehicle and a method for operating a motor vehicle having an exhaust gas heating device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE SEVERAL VIEWS OF THE DRAWING

Figure 2:
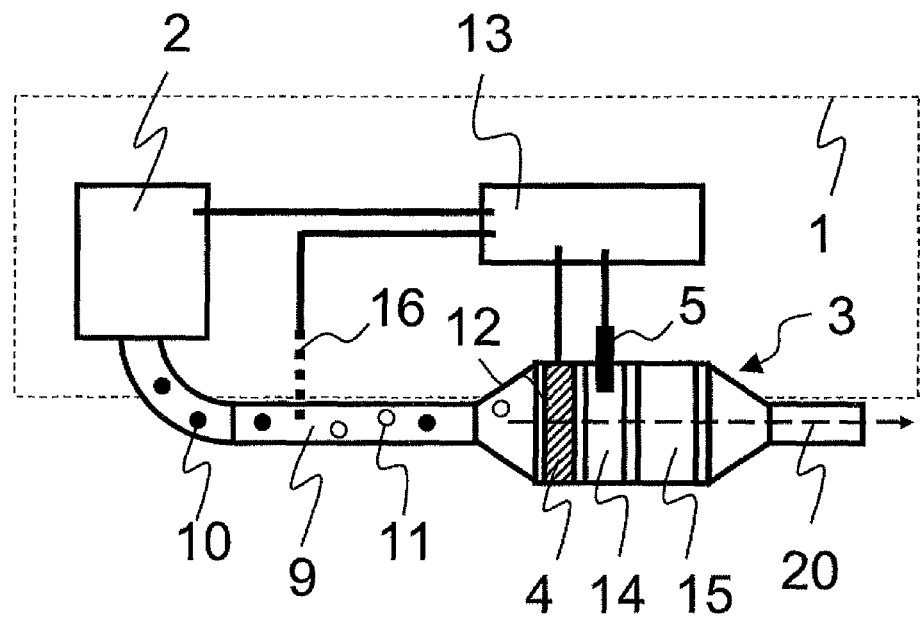

FIG. 1 is a diagram illustrating one possible mode of operation of a method according to the invention; and FIG. 2 is a schematic and block diagram showing a possible construction of an exhaust system for operating a motor vehicle according to the method explained herein.

DETAILED DESCRIPTION OF THE INVENTION

Referring now in detail to the figures of the drawings, which show particularly preferred embodiment variants to which the invention is not restricted, and first, particularly, to FIG. 1 thereof, there is seen a diagram in which an operating parameter 6 of an exhaust system (in this case a temperature 21) is plotted against a time course 19. Proceeding from the left, it can be seen that the operating parameter 6 substantially adheres to a fixed value. At this time, it would for example be possible for step (a) to be carried out and for the present operating parameter 6 to be detected. Subsequently thereto, an influential variable or value 7 of the heating device is now determined (as per step (b)). In this case, the influential variable 7 is illustrated by dashed lines and it is detected during a comparison of the influential variable 7 with a target parameter 8 (illustrated herein by dashed lines), that the influence is so great that the target parameter 8 can be reliably reached. For this reason, the heating device is now activated over an activation time period 17. In the case illustrated herein, the activation time period 17 is sufficient to raise the operating parameter 6 over the target parameter 8, in such a way that the desired result is reliably ensured.

Further to the right in the diagram, that is to say at an (arbitrary) later time, a different situation is illustrated by way of example. In this case, it is for example detected that, in a subsystem of the exhaust system, a temperature increase to the target parameter is now necessary. The engine management system would now start an activation request 18 at the illustrated time. Now, at the time of the activation request 18, the method according to the invention is carried out once again, with it being detected during the comparison of the influential variable 7 with the target parameter 8 that the target parameter 8 cannot be reached through an activation of the heating device. The heating device is therefore not activated in this case, but rather other measures (influence on the combustion processes in the drive, use of additives, etc.) are resorted to first.

FIG. 2 schematically illustrates the construction of a motor vehicle 1 having a drive 2 and an exhaust system 3. Exhaust gas 9 generated in the drive 2 flows in a flow direction 20 through the exhaust system 3, with the exhaust gas flowing through a plurality of exhaust-gas purification components. The exhaust gas 9 can, for example, include particles 10. It is also possible for a supply 16 for an additive 11 (air, water, reducing agent, fuel, . . . etc.) to be provided. The exhaust gas 9 now impinges on a heating device 4 which should in be embodied as an electrically heatable honeycomb body 12 this case. Provided downstream of the controllable heating device 4 in the flow direction 20 is a catalytic converter 14 and an accumulator 15 (for example an absorber, particle trap or the like). In this case, the converter 14 is provided with an internal measuring sensor 5, by way of example for several other possible positions in the exhaust system 3.

In order to carry out the method described herein, the heating device 4 is also connected to a control unit 13 which is, for example, connected to an engine management device and/or to the drive 2 and/or to the measuring sensor 5 and/or to the supply 16 for the additive 11. In order to carry out the method according to the invention, the control unit 13 can be provided with a corresponding software and data processing device.

The invention claimed is:

1. A method for operating a motor vehicle, the method comprising the following steps:
providing the motor vehicle with a drive and an exhaust system having at least one controllable heating device to be placed in contact with exhaust gas;
(a) detecting at least one operating parameter of the exhaust system, wherein the operating parameter is a temperature of the exhaust gas or a temperature of an exhaust gas cleaning component;
(b) determining at least one influential variable of the heating device, wherein the influential variable is a temperature increase potential of a heating power for a given exhaust gas mass flow;
(c) comparing the at least one influential variable with a target parameter of the exhaust system, wherein the target parameter is a predefined value of the operating parameter of the exhaust system;
(d) activating the heating device in such a way that the operating parameter reaches the target parameter, whereby the heating device is only activated when the operating parameter is able to reach the target parameter; and
denying an external activation request of the heating device when the influential variable determined in step (b) is not sufficient to insure that the operating parameter is able to reach the target parameter as required in step (d);
wherein steps (a)-(d) are started when the drive is activated, steps (a)-(d) are carried out continuously after being started, and steps (a)-(d) are ended when the drive is deactivated.

2. The method according to claim 1, which further comprises carrying out the method at least during a predominant time period between activation and deactivation of the drive.

3. The method according to claim 1, which further comprises carrying out step (a) by detecting at least one of the following parameters as operating parameters: exhaust-gas temperature or exhaust-gas mass flow.

4. The method according to claim 1, which further comprises carrying out step (b) by determining a heating power of the heating device as an influential variable.

5. The method according to claim 1, which further comprises carrying out step (c) by selecting the target parameter of the exhaust system from at least one of the following parameters: exhaust-gas temperature, capacity for a reduction of particles contained in the exhaust gas, probability of catalytic reaction, or capacity for conversion of a state of aggregation of the exhaust gas or of an additive.

6. The method according to claim 1, which further comprises carrying out step (d) as a function of the target parameter over a predefined activation time period and with the heating device subsequently being deactivated.

7. The method according to claim 1, which further comprises carrying out step (d) with at least one electrically heatable honeycomb body.

8. The method according to claim 1, which further comprises calculating at least one of the following variables: operating parameter of the exhaust system, influential variable of the heating device, or target parameter of the exhaust system.

9. A motor vehicle, comprising:
a drive emitting exhaust gas;
an exhaust system having at least one controllable heating device to be placed in contact with the exhaust gas; and
a control unit connected at least to said heating device and programmed for carrying out the following steps:
(a) detecting at least one operating parameter of the exhaust system, wherein the operating parameter is a temperature of the exhaust gas or a temperature of an exhaust gas cleaning component;
(b) determining at least one influential variable of the heating device, wherein the influential variable is a temperature increase potential of a heating power for a given exhaust gas mass flow;
(c) comparing the at least one influential variable with a target parameter of the exhaust system, wherein the target parameter is a predefined value of the operating parameter of the exhaust system;
(d) activating the heating device in such a way that the operating parameter reaches the target parameter, whereby the heating device is only activated when the operating parameter is able to reach the target parameter; and
denying an external activation request of the heating device when the influential variable determined in step (b) is not sufficient to insure that the operating parameter is able to reach the target parameter as required in step (d);

wherein steps (a)-(d) are started when the drive is activated, steps (a)-(d) are carried out continuously after being started, and steps (a)-(d) are ended when the drive is deactivated.

10. The method according to claim 1, which further comprises carrying out step (c) by selecting the target parameter of the exhaust system from at least one of the following parameters: exhaust-gas temperature, capacity for a reduction of particles contained in the exhaust gas, probability of catalytic reaction, or capacity for conversion of a state of aggregation of an additive.

* * * * *